US006256484B1

(12) United States Patent
Conner et al.

(10) Patent No.: US 6,256,484 B1
(45) Date of Patent: *Jul. 3, 2001

(54) DIVERSITY RECEPTION SYSTEM

(75) Inventors: Charles E. Conner, Lincoln; Robert B. Basine, Waverly, both of NE (US)

(73) Assignee: Telex Communications, Inc., Lincoln, NE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/807,880

(22) Filed: Feb. 26, 1997

(51) Int. Cl.[7] .................................................... H04B 17/02
(52) U.S. Cl. ........................ 455/137; 455/273; 455/277.1
(58) Field of Search .................................... 455/137, 138, 455/272, 273–277.1, 277.2, 278.1; 375/347

(56) References Cited

U.S. PATENT DOCUMENTS

| 4,293,955 | * | 10/1981 | Gehr et al. ........................ 455/278.1 |
| 5,241,701 | * | 8/1993 | Andoh .................................. 455/272 |
| 5,361,404 | * | 11/1994 | Dent .................................. 455/277.2 |
| 5,392,054 | * | 2/1995 | Bottomley et al. .................. 343/702 |
| 5,697,075 | * | 12/1997 | Kim .................................. 455/277.1 |

* cited by examiner

Primary Examiner—Nay Maung
(74) Attorney, Agent, or Firm—Vincent L. Carney

(57) ABSTRACT

An inexpensive diversity receiver compares the received signal strength signal with a threshold value. When the received signal falls below the threshold value a signal is transmitted through a conductor and a delay circuit to a NAND gate. If the signal is applied to the the two inputs of the NAND gate at the same time, the output of the NAND gate switches a bistable flip-flop which in turn connects or disconnects a second antenna that is 180 degrees in phase from the first antenna between a state in which the signals from the two antenna is combined and a state in which they are not combined and only one antenna applies signals to the receiver.

18 Claims, 3 Drawing Sheets

DIVERSITY RECEPTION SYSTEM

BACKGROUND OF THE INVENTION

This invention relates to diversity radio receivers.

In one class of diversity radio receivers, a plurality of antennas are positioned to receive signals transmitted from a single transmitter. The circuitry connecting the antennas to the rest of the diversity receiver reduces fading caused by multipath cancellation of the signals from the single transmitter. In some such receivers a signal indicating the strength of the received signal controls the circuitry in such a manner as to minimize multipath cancellation of signal.

In some prior art diversity receivers of this class the signal from the squelch circuit controls the switching of the receiver from antenna to antenna to obtain the best signal. A phase shift is imposed between the signal received from one antenna and the signal from the other antenna. In other prior art diversity receivers, signals from both antennas are added together and the phase is continually changed in accordance with changes in the sum of the signals. In still another type of diversity receiver of this class, the signals from the antennas are modulated with an average frequency carrier to remove phase shift components and the signals are added together to provide a total signal stronger than the individual signals received by each antenna.

The prior art space diversity receivers have the disadvantage of being relatively complex and thus expensive. Some are complex because the signals are applied from each antenna to a corresponding one of several portions of receivers before being added for final processing. Moreover, some of the circuits for correcting for phase shift, or for switching from antenna to antenna or receiver to receiver or for modulation of signals are complicated and expensive.

SUMMARY OF THE INVENTION

Accordingly, it is an object of this invention to provide a novel method and apparatus for reducing fading from radio systems.

It is a still further object of the invention to provide a simple and inexpensive space diversity radio receiver.

In accordance with the above and further objects of the invention, a space diversity radio system includes at least first and second antennas, antenna switching circuitry, receiver circuitry and a means for detecting a drop in the signal strength received by the receiver circuitry. A one-half wavelength phase shift is provided between the first and second antennas. In the preferred embodiment, the phase shift is obtained by physically spacing the antennas from each other by one-half of a wavelength.

Only one of the first and second antennas is always connected to the first stage of the receiver. The other antenna is connectable to one antenna through a switch. Switching circuitry closes or opens the switch to connect one antenna or a plurality of antennas to the rest of the receiver circuitry when the signal strength drops below a certain threshold. The switching circuitry includes a flip-flop that is switched to connect another antenna to the receiver circuitry when the signal strength drops.

If the signal strength increases as a result of the addition of the antenna, the receiver circuitry remains connected to the antenna, but if it decreases again and remains decreased, the switching circuitry switches back to disconnect the second antenna. In another embodiment, a second threshold is provided that is activated by the squelch signal to cause the switching circuit to connect or disconnect antennas upon a receiving sufficiently low signal strength.

The switching circuit to which the received strength indicator signal is applied conducts it through two paths with opposite polarity output to a NAND circuit. One of the two paths includes a time delay in the form of a one shot multivibrator but the other switches the NAND circuit after only a short propagation delay. Consequently, if the received signal strength indicator signal doesn't improve in a time shorter than the delay time of the one shot multivibrator, the switching circuit will change states again. When the flip-flop is activated by the NAND gate, it applies a potential to a diode switch connecting the two antennas. When a positive signal is applied to the anode of the diode, the signals on the two antennas that are separated by half a wavelength are combined. When there is a negative signal applied to the anode, the diode is blocked and only the signal from the first antenna is applied to the first stage of the radio receiver.

In operation, a transmitted signal is received by each of the first and second antennas along the multipath transmission path between the transmitter and the receiver. When the intensity of a signal from the one antenna or antennas connected to the first stage of the receiver falls, the received signal strength indicating signal begins to drop and causes the antennas to change configurations, and after the delay time, if it is still dropping, a NAND circuit energizes a flip-flop to again switch causing a change in configurations. When the flip-flop changes states, the switch connecting the antennas switches states between its open and closed condition. If the signal does not continue to drop nor remain low, the NAND gate does not open and the flip-flop does not change states. Since the flop-flop has not changed states, the switch does not change states and the antennas remain in their previous groupings. In a second embodiment, if the signal continues to decrease, a lower threshold opens the NAND gate to switch antenna configurations. The required amount of delay time to determine if switching is needed can be adjusted for the location and circumstances.

While the diversity receiver has been described as having two antennas, one-half wavelength apart, other combinations of antennas may be used including, for example, two antennas spaced at other increments than one-half wavelength for other combinations or more than two antennas. Moreover, while a diode switch is preferable such as a PIN diode switch because of its economy, other switches may be utilized such as an FET switch or the like.

From the above description, it can be understood that the space diversity receiver system of this invention has several advantages such as for example: (1) it is relatively inexpensive and simple in construction; (2) it is less subject to false switching; (3) it can be adjusted easily to test for a weak signal for different periods of time before switching; and (4) it is very reliable.

SUMMARY OF THE DRAWINGS

The above noted and other features of the invention will be better understood from the following detailed description when considered with reference to the accompanying drawings in which.

DETAILED DESCRIPTION

Figure 1:
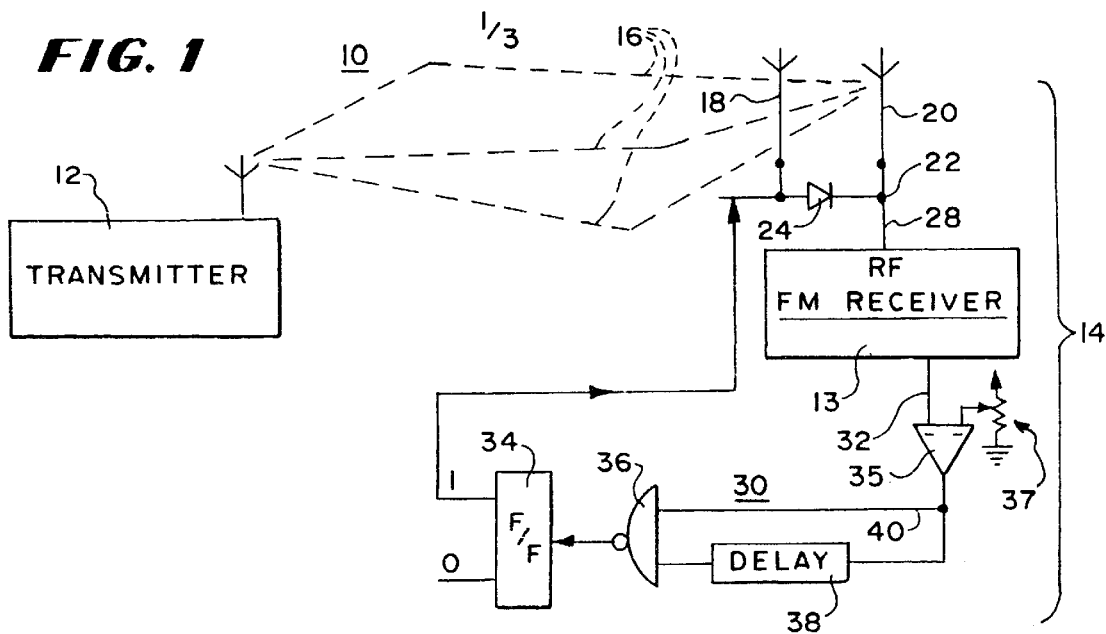
FIG. 1 is a block diagram showing an embodiment of the invention.

In FIG. 1, there is shown a diversity radio system 10 having as its principal parts a transmitter 12 and a receiver 13. In the preferred embodiment illustrated by FIG. 1, the transmitter 12 is a portable beltpack or hand-held portable transmitter but may be part of a central station or portable transceiver and the receiver 13 is part of a central station 14 in the preferred emobodiment but may be a portable unit as well. The receiver and transmitter communicate with the receiver being a central communication link in the preferred embodiment. As shown in FIG. 1, the transmitter 12 transmits a signal through a plurality of paths 16 to the central station 14. One reason the signal may follow different paths is because of reflections from objects.

The central station 14 includes first and second antennas 18 and 20, an antenna-signal combining circuit 22, a switch 24, a switch control circuit 30 and a receiver 13. The first and second antennas are separated one-half wavelength from each other. The second antenna 20 is electrically connected to the first stage of the receiver 13 to apply signals thereto. The switch 24 is connected between the first and second antennas 18 and 20 and is controlled by the switching circuit 30 to combine signals in one state and to apply only the signals from the second antenna in another state. The switch is a diode switch that disconnects or connects the antennas depending on its bias state.

The antenna-signal combining circuit 22 is electrically connected to the first antenna 18 and to the second antenna 20 to combine the signals received from these antennas when the switch 24 is closed and to disconnect the first and second antenna from each other when the switch is open. It is electrically connected to the receiver 13 through a conductor 28 to supply: (1) under some circumstances, the resulting summation of the signals from the first and second antennas 18 and 20 through the closed switch to the receiver 13; and (2) under other circumstances, to supply the signals only from the second antenna 20 to the receiver 13 with the switch 24 between them being open. The switch 24 is electrically connected to the receiver 13 through the conductor 28 to supply combined signals or separate signals depending on its state. Its state changes when the signal is fading because of cancellation of the radio waves transmitted along a plurality of paths 16 from the transmitter 12 to the first and second antennas 18 and 20 of the receiver.

The receiver 13 includes the usual receiver circuitry with a conventional squelch control circuit. The squelch control circuit indicates when the signal is below a threshold value in the receiver in a manner known in the art. The conductor 32 thus receives the indication when the receiver 13 is receiving no signal or a weak signal and transmits it to the switch control circuit 30.

Although the potential applied to conductor 32 in the preferred embodiment is derived from the squelch control circuit, it may be derived from other locations in the receiver or indeed by a separate receiver which detects the presence or absence of a signal. Moreover, while in the preferred embodiment, the central station 14 includes a receiver, the invention may be used with a central station that includes a transceiver.

The switch control circuit 30 includes the switch 24, flip-flop 34, a NAND gate 36, a delay circuit 38 and a comparator 35. The conductor 32 electrically connects the squelch control circuit to the switch control circuit 30, for detecting when the received strength indicator signal is above a fixed threshold or below a fixed threshold. The conductor 32 is connected to one input of the comparator 35 and the other input of the comparator 35 is connected to a reference voltage 37. In the preferred embodiment, the reference voltage is fixed but it may be derived from a potentiometer tap as shown in FIG. 1 to permit adjustment of the threshold switching level in accordance with conditions. The output of the comparator 35 is connected to the NAND gate 36 in two parallel paths, one of which is through a conductor 40 and the other of which is through a circuit line 38.

The output of the NAND gate 36 is electrically connected to the flip-flop 34 and the digital one, positive output of the flip-flop 34 is electrically connected to the anode of the diode 24 and to antenna 18. The cathode of the diode 24 is electrically connected to the antenna 20. With this arrangement, the antenna 20 is always active. Antenna 18 is only active when a positive signal is applied to its anode from the flip-flop 34 to permit conductivity between the antennas 18 and 20.

In the resting state when the signal strength to the receiver is adequate, the input to the NAND 36 from the conductor 32 is low and the input from the delay 38 is high. When the squelch control initiates a cycle to indicate the signal received by the receiver 14 has fallen, conductor 32 goes high and this triggers flip flop 34 to change antenna states. The signal from conductor 32 also causes the input to NAND gate 36 from delay 38 to go low after short delay such as between 0.1 to two microseconds determined by propagation time through the gates contained in 38.

After a long delay in the range of 10 microseconds to 100 milliseconds determined by a resistor capacitor combination within delay circuit 38, the input to NAND gate 36 from delay 38 returns to its original high state. If at this time the change in antenna states caused an improvement, then conductor 32 is low and flip flop 34 is not retriggered. If the change in antenna states did not cause an improvement, then conductor 32 is still high and flip flop 34 is retriggered after the delay to return the antenna state to that which existed before the cycle began. The long delay through this delay circuit 36 is adjustable and in the preferred embodiment is approximately 1 millisecond.

The operator of receiver 13 may use it while the transmitter 12 or receiver 13 is being moved from place to place such as in the case of a hand held transmitter or receiver or a vehicle mounted transmitter or receiver or any other conditions in which the paths the radio waves take between the transmitter and the receiver changes. When used, the radio waves transmitted from the transmitter 12 follow different paths to the antennas of the central station 14. In some locations, such as in a factory building or the like, the reflections change from time to time and cause cancellation and fading at certain locations.

Some cancellation from the multipath signal can be tolerated and compensated for by the limiter in the FM receiver of the preferred embodiment or by an automatic gain control of an AM receiver. However, when the signal at first antenna 18 is nearly equal to the signal at second antenna 20 and the phase difference is close to 180 degrees, the signal fades entirely and is not received above the noise.

Figure 2:
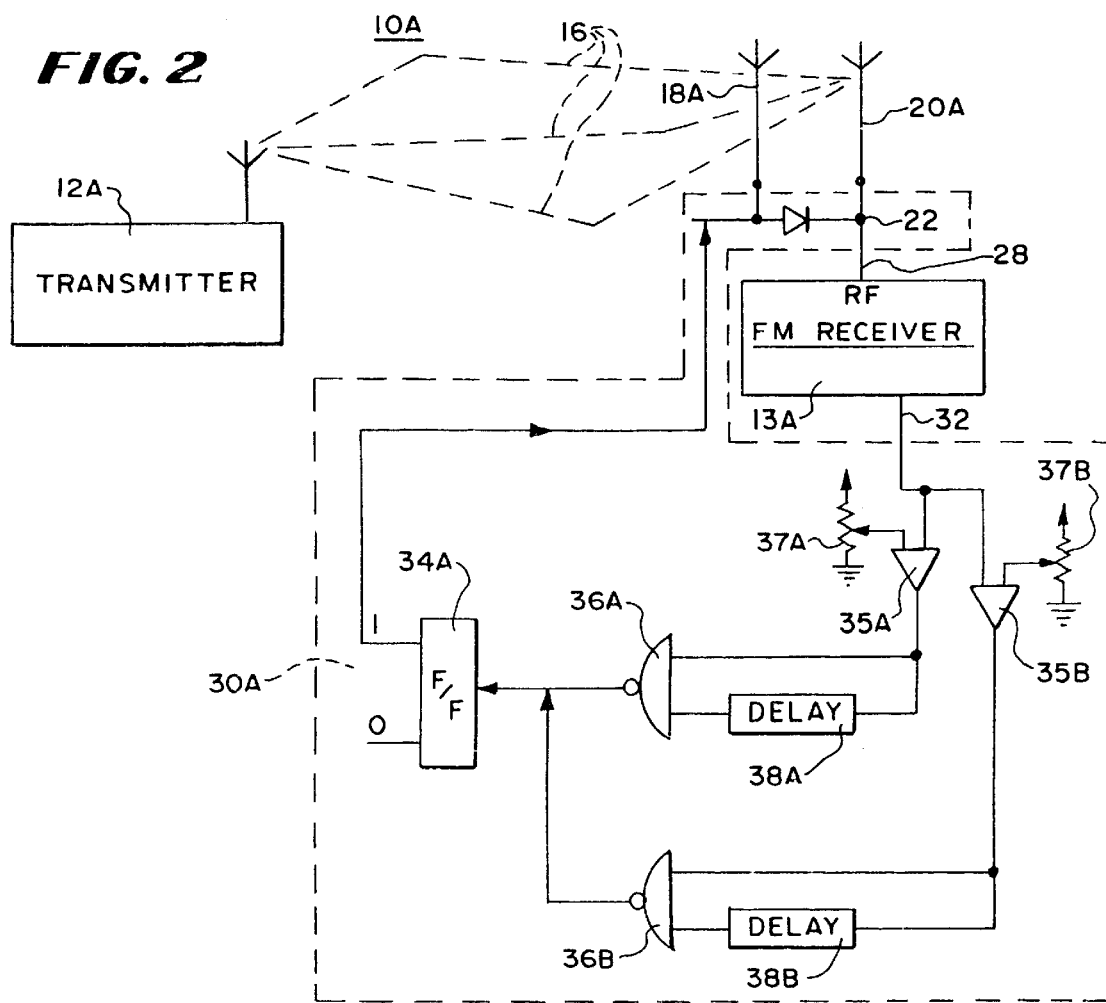
FIG. 2 is a block diagram showing a second embodiment of the invention.

In FIG. 2, there is shown another embodiment of diversity receiver 10A intended for UHF rather than VHF as is the case with FIG. 1. Thus the transmitter 12A and receiver 13A differ but only in a conventional manner and the transmitters and receivers are not part of the invention except insofar as they cooperate with the switch 24A and the switching circuit 30A. The switching circuit 30A differs from the switching circuit 30 in that the circuit 30A incorporates an additional delay circuit, additional comparator and additional NAND gate. The two comparators 35A and 35B are connected to receive the same squelch circuit but have different threshold reference values. The two NAND gates 36A and 36B independently receive their signals from different comparators or different parts of the same squelch control circuit so as to generate their signal at different values of the received signal strength indicator. One of the two comparators is set at a lower value of received signal than the other and is thus triggered only at a lower value. The two delay circuits and NAND gates are connected in parallel to the controlling flip-flop so that the antenna is switched from one position to the other: first when a higher signal is present, and if it does not at that higher signal stop dropping but continues dropping, then at the lower strength signal.

Figure 3:
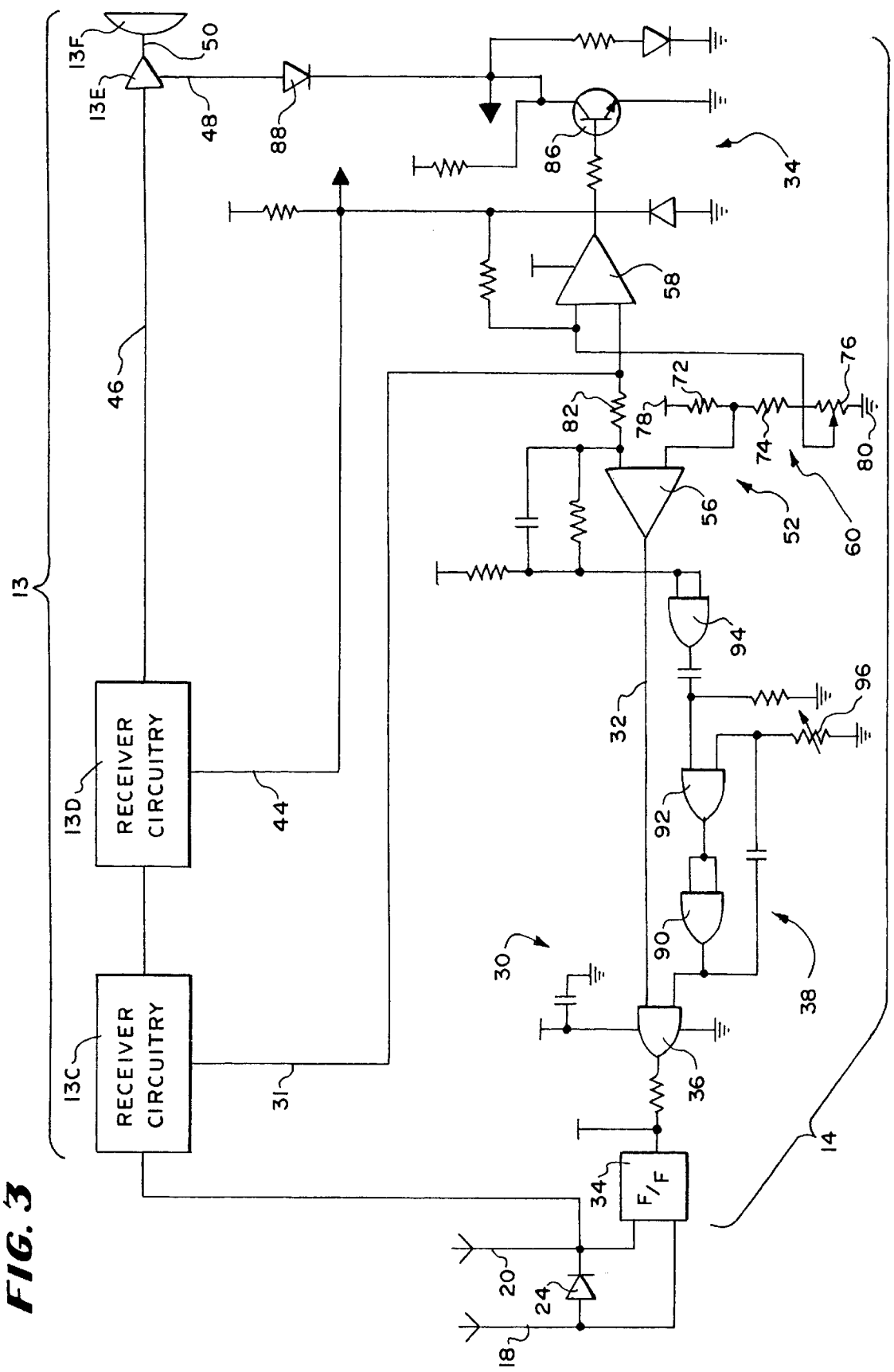
FIG. 3 is a schematic circuit diagram showing one embodiment of FIG. 1.

In FIG. 3, there is shown a schematic circuit diagram of the diversity radio system 10 having a receiver 13, a switching circuit 30, antennas 18 and 20 and a switch 24. The receiver 13 includes receiver circuitry 13C and 13D, the squelch switch 13E and a speaker 13F. The circuitry 13C, 13D, squelch switch 13E and speaker 13F are conventional and not part of this invention except insofar as they cooperative with the switching circuit 30.

The switch 24 has its anode directly connected to the first antenna 18 or a first group of antenna, a positive output of the flip-flop 34 and the switching circuit 30 and to the first stage of the receiver circuitry 13C to provide signals thereto. The cathode of the diode 24 is electrically connected to the antenna 20 or groups of antennas 20 and to the negative or positive zero output of the flip-flop 34. Thus the antenna 20 is continually connected to the receiver circuitry 13C with the signal from the antenna 18 being added at 180 degrees to the signal from the antenna 20 for application to the receiver circuit 13C under the control of the switching circuit 30 and at other times being disconnected from the receiver circuitry 13C.

The receiver 13C is connected to the switching circuit 30 through the conductor 32 and to the input of the receiver circuitry 13D which supplies audio signals to the squelch circuit 13E and to the switching circuit 30 through the conductor 44. The squelch switch 13E receives signals from the receiver circuitry on its input through a conductor 46, has its output control by a signal from the switching circuit 30 on conductor 48 and supplies audio signals to the input of the speaker 13F through the conductor 50.

The switch 30 includes the flip-flop 34, the NOR gate 36, delay circuit 38, the signal strength switching circuit 52 and squelch signal control processing circuit 54. The NOR gate 50 has its output electrically connected to the flip-flop 34 to switch it to the binary one state in which a positive voltage is applied to the anode of the diode 24, permitting the radio signals from antenna 18 to be conducted through the diode 24 and added at 180 degree angle to the signals received on the antenna 20 for application to the receiver circuit 13C.

When the NOR circuit is switched again, the flip-flop 34 switches to the binary negative signal, disconnecting the switch 24 so that only signal received on the antenna 20 is applied to the first stage of the receiver circuitry 13C. Thus, the dropping received signal strength triggers switching of the connection between antennas from one state to another. While two antennas are disclosed in FIG. 3, spaced one-half of the wavelength apart, other antenna arrangements may be used so that the reception of signals at different phases depending on the spacing of the antennas may be altered until an optimum arrangement is found from the different configurations of antennas and delays between the antennas.

The NOR gate 36 directly receives a signal from the signal strength switching circuit 52 and receives a signal through the delay circuit 38, which is a one-shot multivibrator to incorporate a delay in the signal before reaching the NOR gate 36. Any suitable type delay may be used to provide an adequate signal to the NOR gate 36 which lasts while the signal strength is below a threshold signal strength but the delay circuit 38 has special features. The delay circuit 38 includes first, second and third NOR gates 90, 92 and 94 connected in series between the output of the compartor 56 and the input of the NOR gate 36. These components are inexpensive, readily available and surface mountable.

The two inputs of the NOR gate 94 are connected to the output of the comparator 56, the output of the NOR gate 94 is connected through a 0.001 UF (microfarad capacitor) to a first input of the two input NOR gate 92, with a 10K resistor connecting to the input and capacitor to ground to form a 7 microsecond RC delay. The 10K resister could be replaced by a potentiometer to vary the delay time as shown but in the preferred embodiment is a fixed resistor (not shown in FIG. 3). The output of the NOR gate 92 is connected to both inputs of the NOR gate 90 and the output of the NOR gate 90 is connected to one input of the NOR gate 36 and through a 0.01 UF capacitor to: (1) the second input of the NOR gate 92; and (2) to ground through a 150K resistance 96 to provide a one-shot multivibrator with a 1 millisecond delay time. The 150K resister 96 may be as potentiometer as shown to provide a variable delay time. This arrangement not only provides an adjustable delay but provides economy by causing a single four NOR gate package to provide both the delay circuit and the NOR gate of the switching circuit 30.

The signal strength processing circuit 52 includes first and second comparators 56 and 58 and a squelch control circuit 60. The noninverting input terminal of the comparator 56 is electrically connected to the signal strength conductor 31 which provides a signal representing the strength of the input signal from the antenna or antennas (RSSI signal) and its inverting input terminal is electrically connected to the squelch control circuit 60. The output of the comparator 56 is directly connected to one of the two inputs of the NOR circuit 36 to apply a signal thereto when the RSSI signal drops below a threshold value set in the squelch control circuit.

The comparator 56 has its noninverting input terminal electrically connected to the squelch control circuit 60 and its noninverting input terminal electrically connected through conductor 31 to receive the strength of the received signal (RSSI). Its output terminal is electrically connected to the squelch control circuit 54. This processing circuit 54 is electrically connected to the squelch circuit 13E to control the output to the speaker 13F to terminate the signal for purposes of squelching to reduce noise to the speaker 13F connected to the output of the control circuit 13E.

The squelch control circuit 60 includes a potentiometer including a 15K resistance 72, a 1K resistance 74 and a 5K veriable resistance 76 connected between a source of 10 volts 78 and ground indicated at 80. The inverting input terminal of the comparator 56 is electrically connected to the voltage divider formed by resistors 72 and 74 to establish the threshold voltage value for switching the antenna array. The potentiometer 76 is connected to the noninverting input terminal of the comparator 58 to establish the squelch value and to cooperate with conductor 44 for the squelch signal. Thus, the potentiometer 76 adjusts the threshold value for switching. The noninverting input terminal of the comparator 56 is electrically connected to the inverting input terminal of the comparator 58 through a 58.2K resistor 82 with conductor 31 being connected between one end of the resistor 82 and the inverting input terminal of the comparator 58.

Conductor 44 is connected to the feedback circuit of the comparator 58 and the output of the compartor 58 is connected to the squelch and limiting processing circuit 54. The circuit 54 includes the NPN transistor 86 and the anode of the diode 88 to apply signals through conductor 48 to the squelch circuit 13E for controlling signals to the speaker 13F. With this arrangement, the strength signal on conductor 31 causes the switching of the combinations of antennas that are to apply radio frequency signal to the receiver 13C.

Figure 4:
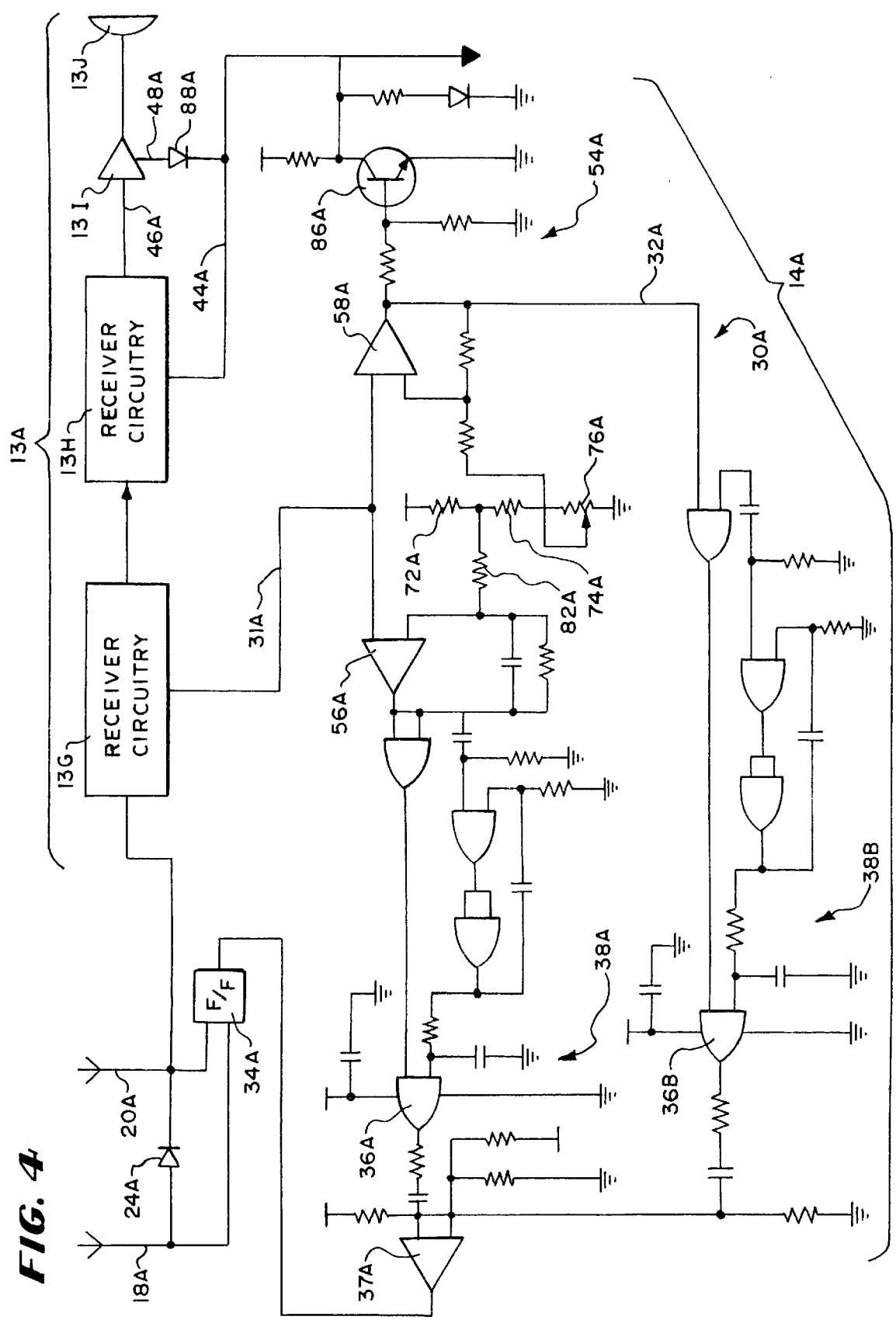
FIG. 4 is a schematic circuit diagram showing the embodiment of FIG. 2.

In FIG. 4, there is shown a schematic circuit diagram of the central station 14A which is similar to the central station 14 of FIG. 3 except that it provides two levels of received signal strength in the switching circuit 30A at which the antenna arrangement may be switched. The circuit of FIG. 4 in its preferred embodiment is intended for ultra-high frequency reception rather than very high frequency reception as was the case in the embodiments of FIGS. 1 and 3. However, the circuit differences between the embodiment of FIGS. 2 and 4 are substantially only those necessary to accomodate the higher frequency and to provide an additional signal strength threshold at which switching occurs.

To provide the additional switching threshold, the receiver 14A includes the antennas 18A and 20A, the diode 24A and the switching circuit 30A. The antennas 18A, 20A, the diode 24A and the flip-flop 34A operate substantially in the same manner as their corresponding parts in FIG. 3. However, the switching circuit 30A includes the amplifier 37A to which the NOR gate 36A is connected as well as the NOR gate 36B for a second parallel circuit. Similarly, delay circuit 38B is substantially the same as the delay circuit 38A, being a monostable multivibrator connected to one input of a NOR gate 36B. The input of the NOR gate 36B is connected directly to receive the signal on conductor 32A. Both NOR gates are electrically connected to the noninverting input terminal of the amplifier 37A so that signals from either the NOR gate 36A or the NOR gate 36B causes switching of the flip-flop 34A to change the configuration of antennas providing signals to be combined and applied to the first stage of the receiver circuitry 13G.

The signal applied to the delay circuit 38B originates with the output from the comparator 58A. The inverting terminal of the comparator 58A is electrically connected through conductor 31A to the receiver circuitry 13G to receive the RSSI signal indicating the strength of the received signal. Thus it is the same signal that is sent to the squelch circuit 13I from the comparator 58A and to the delay circuit 38B. The amplifier 58A receives its input signal from the tap 76A and the tap 76A is set to a threshold value for a signal which is a lower value of signal strength received by the radio than the signal utilized by the delay circuit 38A. Thus, if the signal continues to grow weaker after it is switched by a signal from the NOR gate 36A, it may be switched again at a lower value by a signal from the NOR gate 36B which may be at the same value that a squelch signal is utilized to block any radio signals to the speaker.

While in the preferred embodiment, the location of the antennas establishes 180 degree time delay between them, they may be located closer together and a timed delay used to compensate and provide the 180 degree delay. Similarly, other delay times may be utilized although in the preferred embodiment 180 degree delay between the antennas, established by spacing of the antennas, is preferred for reasons of economy and simplicity.

From the above description, it can be understood that the diversity system of this invention has several advantages such as: (1) it is relatively simple and inexpensive in construction; (2) it is reliable; (3) it is less subject to false switching; and (4) it can be adjusted easily to test for a weak signal for different periods of time before switching.

Although a preferred embodiment has been described with some particularity, many modifications and variations are possible in the preferred embodiment without deviating from the invention. Therefore, it is to be understood that, within the scope of the appended claims, the invention may be practiced other than as specifically described.

What is claimed is:

1. Apparatus for processing electromagnetic signals transmitted at a carrier frequency over a multipath route, comprising:

at least first and second antennas;

switch means having a first and second state;

means for adding the received signals received by said first and second antennas together to provide a sum signal only when said switch means is in a predetermined one of said first and second states;

time delay means for delaying said received signals for at least 90 degrees of a cycle of the carrier wave of said signals when said switch means is in said second state;

receiver means for processing said received signals;

indicating means for providing a level indicating signal related to the amplitude of one of said received signal and sum signal;

said switch means being responsive to said indicating means for selectively switching said switch means between said first and second state;

said switch means including first and second conductor means having different amounts of delay and means for detecting the presence of the level indicating signal on both the first and second conductor means wherein said switch means changes state only when said one of said received signal or sum signal drops below a threshold strength.

2. Apparatus according to claim 1 in which said time delay means includes means for providing a phase shift of 180 degrees of a cycle of the carrier frequency.

3. Apparatus according to claim 1 in which said level indicating signal is a control signal and said indicating means includes a squelch control circuit for representing the strength of a received signal by the level indicating signal.

4. Apparatus according to claim 1 in which said switch means further includes diode switch means for closing said diode switch means in response to one signal level indicated by said level indicating signal from said indicating means and opening said diode switch means in response to another signal level indicated by said level indicating signal.

5. Apparatus according to claim 1 in which another signal level indicated by said level indicating signal serves as a squelch signal and said indicating means includes a squelch detector for detecting the strength of a said sum signal.

6. Apparatus in accordance with claim 1 in which the time delay provided by said delay means is in a range of between 10 microseconds and 100 milliseconds.

7. Apparatus according to claim 1 in which said switch means includes means for changing state only when one of said received signal or sum signal drops below said threshold strength for a preset period of time.

8. Apparatus according to claim 1, wherein:

said receiver means has an input;

a predetermined one of said first and second antennas being continuously connected to the input of said receiver means and the other one of said first and second antennas being connected to said input of said receiver means only when said switch means is in said predetermined one of said first and second states;

said time delay means being between said first and second antennas wherein said received signals are added with said time delay of at least 90 degrees to provide a sum signal only when said switch means is in said predetermined one of said first and second states.

9. Apparatus according to claim 8 in which said time delay means includes means for providing a phase shift of 180 degrees of a cycle of the carrier frequency.

10. Apparatus according to claim 8 in which said level indicating signal is a control signal and said indicating means includes a squelch control circuit for representing the strength of a received signal by the level indicating signal.

11. Apparatus according to claim 10 in which said switch means further includes a diode switch for closing said diode switch means in response to one signal level indicated by said level indicating signal from said indicating means and opening said diode switch means in response to another signal level indicated by said level indicating signal.

12. Apparatus according to claim 8 in which said switch means further includes a diode switch for closing said diode switch means in response to one signal level indicated by said level indicating signal from said indicating means and opening said diode switch means in response to another signal level indicated by said level indicating signal.

13. Apparatus according to claim 8 in which another signal level indicated by said level indicating signal serves as a squelch signal and said indicating means includes a squelch detector for detecting the strength of a said sum signal.

14. Apparatus in accordance with claim 8 in which the time delay provided by said time delay means is in a range of between 10 microseconds and 100 milliseconds.

15. A method of processing signals transmitted over multipath routes on a carrier frequency comprising the steps of:

receiving said signals from only one antenna when a switchis in a first state and from at least a plurality of antennas when the switch is in a second state;

switching from said first state to the second state when the received signal drops for a predetermined time;

said at least one antenna and another antenna being spaced at least one-quarter wavelength apart;

initiating said switching between the first and second states when the amplitude of the received signal falls below a predetermined threshold value for a predetermined time;

said step initiating including the substeps of transmitting a signal representing the received signal strength through two paths having different delay times and switching if the signal along both paths coincide at the end of the paths.

16. A method according to claim 15, in which the step of selecting one of the first and second state includes the step of selecting a first state in which there is no phase shift and a second state in which the phase shift is 180 degrees.

17. A method according to claim 6, in which the step of step of selecting said second state includes the step of passing the signal from said one antenna through a time delay circuit.

18. A method according to claim 15, in which the step of comparing the amplitude of the sum of said signals includes the step of comparing the amplitude of a squelch signal in a radio receiver to said predetermined threshold value.

* * * * *